United States Patent Office 3,502,630
Patented Mar. 24, 1970

3,502,630
PROCESS FOR THE PRODUCTION OF POLYVINYL CHLORIDES WITH HIGH STEREOREGULARITY
Giancarlo Borsini, Milan, and Carlo Nicora, Varese, Italy, assignors to Montecatini Edison S.p.A., Milan, Italy
No Drawing. Filed Apr. 1, 1965, Ser. No. 444,811
Claims priority, application Italy, Apr. 2, 1964, 7,036/64
Int. Cl. C08f 1/34, 1/42, 3/30
U.S. Cl. 260—92.8                 14 Claims

ABSTRACT OF THE DISCLOSURE

Process for producing vinyl-chloride polymers having a syndiotactic index greater than 2 wherein a monomeric component containing at least 75% by weight vinyl chloride is polymerized at a temperature between substantially —60° C. and 0° C., in the presence of an organic solvent with a catalyst system having an oxidizing component and a reducing component, said oxidizing component being constituted essentially by at least one tetravalent-cerium compound soluble in the organic solvent, said reducing compound being constituted essentially by an organometallic compound of germanium, tin and lead; the polymer is recovered from the reaction mixture and the trivalent cerium compounds (following polymerization) are oxidized to render them suitable for reuse in further polymerization of vinyl-chloride monomer components.

---

The present invention relates to a process for producing polyvinyl chloride and polyvinyl-chloride compositions with relatively high stereoregularity and, more particularly, to a process of this character employing redox-catalyst systems.

It is well known that the preparation of the vinyl chloride polymers having a stereoregular structure, is carried out by effecting the polymerization at very low temperatures, generally below 0° C. The temperature would seem to have an influence on the stereoregularity of the polymer while it is forming during the polymerization.

More specifically, the influence of the temperature seems to be exerted in the sense that the lower the polymerization temperature the higher is the grade of polymer stereoregularity. As a consequence of a greater order in the polymer chain the resultant product shows a higher degree of crystallinity, i.e. a polymer is obtained having peculiar properties, entirely different from those of the polymers obtained at higher temperatures with polymerization methods commonly used for vinyl chloride.

Such a polymer is particularly suitable for use in the fiber or film fields or for all the other products requiring high second-order transition-temperature, low solubility or swelling in the usual solvents and finally high dimensional stability.

It is known that oxidoreduction (Redox) catalytic systems, owing to the lower activation energy required for the production of chain-initiator radicals, one to carry out polymerization of vinyl monomers, among which must be included vinyl chloride, at relatively low temperatures. In this connection Redox catalytic systems have been suggested, able to carry out vinyl chloride polymerization at temperatures below +20° C. However working with these catalysts the polymerization rate, at temperatures low enough to obtain highly crystalline products, is so slow that such processes can not be employed from an industrial point of view.

It is, therefore, the principal object of the present invention to provide an improved process for the production of stereoregular polyvinyl chloride at elevated reaction rates.

These objects and others which will become apparent hereinafter are attained, in accordance with the present invention, by a process for the polymerization of vinyl chloride based upon our discovery that highly stereoregular polymers can be produced without impeding the reaction rate by carrying out the reaction in the presence of a redox catalytic system including at least one ceric-based oxidizing substance and at least one organometal compound of a metal from Group IV–A of the Periodic Table, long form, (Handbook of Chemistry and Physics, 41st edition; Chemical Rubber Publishing Co., Ohio; pp. 448–449) and preferably selected from the group consisting of germanium, tin and lead. According to the present invention, the organometal compound has the general formula

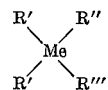

where Me is the metal (i.e. germanium, tin or lead), and each R' represents an organic radical selected from the group consisting of aralkyl, cycloalkyl, aryl and alkyl radicals; R" and R'" may be the same or different and can represent single valences of group such as aralkyl, cycloalkyl, aryl and alkyl radicals, or polar members such as halogen, nitrate ($NO_3^-$), alkoxy, carboxyl and the like; R" and R'" can also be individual valences of a divalent group (e.g. $SO_4^=$). The oxidizing agent of this catalyst is a ceric compound and it is preferred that the organometallic compound constitute the sole reducing agent present with the ceric-derivative oxidizing agent in the reaction system.

While we do not desire to be limited to any particular reaction mechanism, it is believed that the generation of chain-initiating free radicals occurs in accordance with the following reaction scheme:

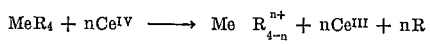

wherein Me is the cantral metal of the reducing compound and R represents R', R" and R'" as given above; $n$ can be 1 or 2 while with $Ce^{IV}$ and $Ce^{III}$, all the possible forms are indicated by which the tetra and trivalent cerium may be present in the system under consideration. It is thus essential for the purpose of the present invention that the organometallic compound and the cerium salt be present simultaneously in the reaction system and that the cerium compound (e.g. a cerium salt) must contain the cerium in a tetravalent state (i.e. as ceric derivative).

The surprising results obtained by this ceric-derivative-based catalytic system, in which the specified organometallic compound is substituted for conventional reducing agents will be immediately apparent when it is observed that this catalytic system is highly effective and active at temperatures which reduce the polymerization rates of conventional redox systems. We have found that best results are obtainable by using tetra-organometallic derivatives of tin and lead, the most satisfactory compounds being the tetramethyl, tetraethyl, tetrabutyl and tetraphenyl compounds of these metals, e.g. $(C_4H_9)_4Sn$, $(C_6H_5)_4Sn$, $(CH_3)_4Pb$ and $(C_2H_5)_4Pb$.

Suitable ceric compounds for the purpose of the present invention are the ceric salts which are soluble in organic solvents and include ceric nitrate, ceric sulfate, ceric ammonium sulfate, ceric ammonium pyrophosphate, ceric ammonium nitrate, ceric iodate and ceric perchlorate. The organometallic derivatives and ceric compounds listed above may be used individually or in mutual admixtures.

We have, moreover, discovered that best results are obtained where the cerium-containing oxidizing agent is an ammonium-containing ceric salt of a strong inorganic acid such as sulfuric, nitric and pyrophosphoric acids.

We have found, moreover, that the polymerizable vinyl-monomeric component of the reaction system should consist predominantly of vinyl chloride although copolymerization is also possible. Our studies have indicated that the monomeric system should consist at least 75% by weight vinyl chloride. Possible monomers capable of copolymerization with vinyl chloride, to the limited extent indicated, are those compatible with vinyl chloride and, for example, of particular interest in this regards are acrylonitrile, vinyl acetate and the like. The reaction temperature can, according to the present invention, range between +50° C. and −100° C., although excellent results are obtained at the lower temperature ranges. In fact, even with a polymerization temperature as low as −60° C., the reaction rate is sufficient to permit industrial exploitation of the process.

The reaction should be carried out according to another feature of the present invention in the presence of a solvent able to dissolve the ceric compounds.

Particularly suitable for the scope are hydroxyl containing substances such as methanol, ethanol, the ethers such as dioxan, tetrahydrofuran and the like, and other organic solvents such as acetonitrile and the like.

Very appreciable results are obtained when operating in a medium with pH below 5.

According to still another feature of the present invention, the polymerization system contains from 0.01 to 3 parts by weight of the organometallic compound and from 0.001 to substantially 1 part by weight (in terms of metallic cerium) of the ceric salt per 100 parts by weight of the monomeric component (i.e. at least 75% vinyl chloride). A significant advantage of the present invention resides in the fact that, whereas other catalyst systems preclude economic recovery of the oxidizing component, the cerous derivative formed during the reaction can be treated to yield a suitable oxidizing agent capable of further reaction. Thus the cerous compound can be recovered from the liquids used to wash the polymer and that from which the polymer is extracted and can be re-oxidized conveniently and economically with sodium hypochlorite, lead dioxide and nitric acid or even by simply heating cerous oxide in air to yield a ceric compound suitable for reuse.

The invention is preferably carried out with tetraethyl lead as the sole reducing component and ceric diammonium hexanitrate $Ce(NH_4)_2(NO_3)_6$ as the cerium-containing salt. The latter is added to the vinyl chloride upon dissolution in the organic solvent. A homogeneous mixture can thus be produced which is maintained under constant stirring at the preferred temperature of 0° C. to −60° C. for the predetermined desired polymerization time. The reaction may then be terminated at this predetermined time by the use of a polymerization-stopping agent in the usual manner. The polymer can then be filtered and washed with an acidic solution (e.g. nitric acid), followed by washing with methanol or other alcoholic medium to neutralization; drying can then be effected at a temperature of about 50° C. under vacuum. The polymers thus produced have a high degree of crystallinity and stereoregularity and have syndiotactic indices (IS) between 2 and 2.8, depending upon the polymerization temperatures. Moreover, the products have molecular weights ranging from substantially 20,000 to substantially 200,000 depending upon the polymerization conditions. These properties make the polymers of the present invention perfectly suitable for use in the fiber and film fields as well as in the container field, for tubes and manufactured goods resistant to boiling water and chlorinated solvents and, as a rule, all those substances which generally can swell the polyvinyl chlorides obtained by standard methods.

The stereoregularity of the vinyl-chloride polymers is determined as indicated in Chimica e l'Industria, volume 46, pp. 166–171, 1964, according to measurement of the infrared spectrum of the polymer itself; as it has been described in another of our copending applications (i.e. Ser. No. 386,061, filed July 29, 1964, now Patent No. 3,409,601), in the polyvinyl chloride infrared spectrum the stereoregularity in the macromolecular chain produces its strongest effects in the region from 600 to 700 cm.$^{-1}$ where there are two bands of particular significance at 635 and 692 cm.$^{-1}$. For this reason the ratio of absorption intensity $$\frac{I(635 \text{ cm.}^{-1})}{I(692 \text{ cm.}^{-1})}$$

of these bands, which we will indicate as IS (syndiotactic index), is taken as an indication of the relative amount of the syndiotactic fraction of the polymer.

The measurements are experimentally obtained by dissolving the polymer in cyclohexanone at about 120° C. for 15 min. to yield a solution of 0.8–1% by weight of polymer. The solution is quickly cooled and evaporated at about 50° C. under a reduced pressure of 10 mm. Hg on a flat glass surface. Films are obtained having a thickness of about 20–30 and are subjected to I-R analysis in a Perkin-Elmer spectrophotometer (Mod. 21) at double radius with a potassium-bromide prism.

The molecular weight of the polymer, in the case of polyvinyl chloride, is determined by means of the value of the intrinsic viscosity measured at 25° C. for solutions of the polymer in cyclohexanone at a concentration of 0.1% by weight. The equation which relates the molecular weight of the polymer to its intrinsic viscosity is the following: $\eta = 2.4 \times 10^{-4} \overline{M}n^{0.77}$ wherein $\eta$ is the intrinsic viscosity in $dl/gr$ and $\overline{M}n$ is the numerical average molecular weight.

The following specific examples illustrate the principles of the present invention.

EXAMPLE I 10.6 grams of monomeric vinyl chloride, previously dried over $CaCl_2$, were condensed at −195° C. into a 25-cc. flask. 0.17 grams of tetraethyl lead and 0.046 grams of $(NH_4)_2Ce(NO_3)_6$, this latter dissolved in 7 cc. of methanol, were introduced into the flask under a nitrogen atmosphere; the pH of the resulting solution was about 1. The flask was sealed and agitated in a thermostatic bath at −40° C. for three hours. After this period, the polymerization was terminated by cooling of the flask with liquid nitrogen. The contents of the flask were subjected to filtering and the solid product then washed initially with methanol acidified with $HNO_3$ and thereafter with methanol only until the liquid phase became neutral. The solid polymer was then dried under vacuum at 50° C. In this manner, 1.2 grams of vinyl-chloride polymer were obtained with a conversion of 11.3%. This product was characterized by an intrinsic viscosity equal to 1.38 dl./gr. corresponding to a molecular weight of 72,000 and a syndiotactic index IS of 2.4.

The test was repeated under similar conditions but in the absence of tetraethyl lead; even when the process was carried out over a period of 24 hrs. there was no sign of polymer formation.

The test was repeated under similar conditions with use of a trivalent cerium salt (0.044 grams of cerous nitrate) in place of the ceric compound, together with 0.17 gram of $Pb(C_2H_5)_4$; even when carried out for a period of 15 hrs. there was no sign of polymer formation.

EXAMPLE II

A three-liter stainless-steel autoclave was thoroughly flushed with nitrogen to completely eliminate air from the interior. Thereafter, 1000 grams of vinyl chloride previously condensed at −78° C. and dried over anhydrous $CaCl_2$ were fed into the autoclave. 9.8 grams of tetraethyl lead and 2.6 grams of $Ce(NH_4)_2(NO_3)_6$, this latter previously dissolved in 500 cc. of methanol, were then added under a blanket of nitrogen in order to render the reaction mixture perfectly homogeneous. The polymerization was carried out by maintaining the contents of the autoclave under stirring for three hrs. at a constant temperature of −40° C.

The reaction mass was then filtered and the resulting solid product washed first with methanol acidified with nitric acid and thereafter only with methanol to neutralization. The quantity of vinyl-chloride polymer obtained after drying under vacuum was 60 grams, i.e. a 6.0% conversion. The syndiotactic index of the polymer was 2.4; the intrinsic viscosity was 1.5 dl./g., corresponding to a molecular weight of 80,000. The unreacted monomer and methanol were recovered by distillation from the filtrate and the washing liquids. The distillation residue was treated with a solution of sodium hypochlorite and yielded a suspension which was filtered. The solids recovered were basic derivatives of lead and tetravalent cerium and were treated with dilute $HNO_3$ in order to dissolve only the lead compound and not the cerium hydroxide, which in turn was dissolved in concentrated $HNO_3$ in the presence of $NH_4NO_3$; in this way 70% by weight of the cerium used initially was recovered in the form of ceric ammonium nitrate by crystallization.

EXAMPLE III

Into a 500-cc. flask, carefully flushed with nitrogen, 100 grams of vinyl chloride (previously dried over $CaCl_2$) were condensed and, thereafter, 1.6 grams of $Pb(C_2H_5)_4$ and 1.9 grams of ammonium ceric sulphate, this latter dissolved in 100 cc. of methanol, were introduced; the resulting reaction mixture was a limpid solution. Polymerization was carried out at a temperature of −30° C. by stirring the contents of the flask for 90 minutes. By the recovery techniques of the preceding examples, 7.5 grams of polyvinyl chloride corresponding to a 7.5% conversion were obtained. From measurement of the intrinsic viscosity, the polymer was determined to have a molecular weight of 60,000. The syndiotactic index IS was 2.30.

EXAMPLE IV

Example I was repeated using, instead of tetraethyl lead, tetramethyl lead in an amount of 0.23 gram. The product obtained after two hours of polymerization at a temperature of −40° C. was separated, filtered and dried as previously indicated and consisted of 1.3 grams of polyvinyl chloride having a molecular weight of 57,000 and a syndiotactic index IS=2.4.

EXAMPLE V

In a two-liter stainless steel autoclave, carefully flushed with nitrogen, 800 grams of vinyl chloride previously dried over anhydrous $CaCl_2$ are condensed at a temperature of −78° C. 21 cc. of tetraethyl lead, and 5.6 grams of ceric ammonium nitrate this latter dissolved in 400 cc. of methanol, were fed into the autoclave. The temperature of the autoclave was brought to −15° C. and the contents stirred for 20 minutes. The resulting product, filtered, washed and dried, weighed 44 grams and was constituted by polyvinyl chloride having a molecular weight of 50,000 and a syndiotactic index IS=2.15.

EXAMPLE VI

In a small, 250-cc. polymerization autoclave, thoroughly scavenged with nitrogen, 100 grams of vinyl chloride dried over anhydrous $CaCl_2$ were condensed at a temperature of −78° C. Thereafter, 2.8 grams of tetraethyl lead and 2.3 grams of ammonic ceric nitrate, the latter dissolved in 70 cc. of methanol, were added. The mixture was stirred four hours at a polymerization temperature of −60° C. When the polymerization was complete, the contents of the autoclave were filtered, washed and dried at 50° C. under vacuum. 9.3 grams of polymer were obtained, having a molecular weight of 60,000 and a syndiotactic index of 2.8.

EXAMPLE VII

Example I was repeated with 0.18 gram of tetrabutyl tin instead of $Pb(C_2H_5)_4$. The product obtained after three hours of polymerization at a temperature of −20° C. was filtered and dried as heretofore described and found to consist of 1.0 gram of polyvinyl chloride with a molecular weight of 60,000 and a syndiotactic index IS=2.2.

EXAMPLE VIII

The air was wholly displaced by nitrogen in a 500 cc. flask; thereafter 250 cc. of liquid vinylchloride, 0.46 gr. of $(NH_4)_2Ce(NO_3)_6$ dissolved in 16 cc. of ethanol with 95% purity degree and separately 1.6 cc. of $Pb(C_2H_5)_4$ were put in.

The whole was kept under stirring for 3 hrs. at −40° C.
The contents of the flask were filtered and the thus obtained product was washed with ethanol.

The amounts of polymer obtained after drying under vacuum was equal to 12.8 gr. with a yield of 5.1%.

The polymer has a syndiotactic index of 2.4.

EXAMPLE IX

Working under the same conditions of the previous example 200 gr. of vinylchloride, 0.3 gr. of

$(NH_4)_2Ce(NO_3)_6$ dissolved in 90 cc. of acetonitrile and separately 1.1 cc. of $Pb(C_2H_5)_4$ were put into.

One half hour after beginning of the polymerization at −40° C., 0.1 gr. of $(NH_4)_2Ce(NO_3)_6$ were furtherly introduced. After 3 hrs. of polymerization the contents of the flask were filtered and the polymer after washing with methanol was dried in oven at 50° C. under vacuum.

The thus obtained polymer weighed 3 gr. and its syndiotactic index was equal to 2.4.

EXAMPLE X

Into a 500 cc. stainless steel autoclave, 200 gr. of liquid vinyl chloride and 0.3 gr. of $(NH_4)_2Ce(NO_3)_6$ dissolved in 36 cc. of methanol were placed.

The reactor was heated to 0° C. and 1.1 cc. of $Pb(C_2H_5)_4$ was added. It was noticed that the polymerization firstly proceeded very quickly and thereafter the polymerization rate was slowed down.

After two hrs. of polymerization the unreacted monomer was permitted to evaporate and the remaining contents of the autoclave were filtered and washed with methanol.

The polymer after drying at 50° C. under vacuum weighed 13 gr. with a yield of 6.5%.

The syndiotactic index was equal to 2.05.

EXAMPLE XI

In a 500 cc. glass flask, the air was wholly displaced by nitrogen. Thereafter 200 gr. of liquid vinylchloride, 0.55 gr. of $(NH_4)_2Ce(NO_3)_6$ dissolved in 12 cc. of methanol and separately 0.75 cc. of $Pb(C_2H_5)_4$ were added.

The whole was stirred at −40° C. for 3 hrs.; thereafter the contents of the flask were filtered and washed with methanol.

The thus obtained polymer was dried in an oven at 50° C. under vacuum.

The polymer weighed 15.4 gr. with a yield of 7.6%.
After measurement of intrinsic viscosity, a molecular weight was obtained equal to 63,000.

The syndiotactic index was equal to 2.4.

EXAMPLE XII

Into a 500 cc. flask, after careful washing with nitrogen in order to wholly replace the air, at −30° C., 320 gr. of liquid vinylchloride, 38 gr. of vinylacetate, 0.44 gr. of $(NH_4)_2Ce(NO_3)_6$ dissolved in 59 cc. of methanol and 1.5 cc. of $Pb(C_2H_5)_4$ were placed.

The mixture was kept under stirring for 3 hrs. at −30° C.

Thereafter the thus obtained product was filtered and washed with methanol.

After drying at 50° C. under vacuum 14.8 gr. of copolymer were obtained.

The IR spectrum showed that the product consisted of a copolymer and the elementary analysis indicated that the copolymer contained 95% vinylchloride and 5% vinylacetate.

EXAMPLE XIII

Into a 500 cc. flask, after careful washing in order to wholly replace the air with nitrogen, 285 gr. of vinyl chloride, 15 gr. of acrylonitrile, 0.52 gr. of $(NH_4)_2Ce(NO_3)_6$ dissolved in 68 cc. of methanol and separately 1.85 cc. of $Pb(C_2H_5)_4$ were placed.

The mixture was kept under stirring for 3 hrs. at −30° C.

The thus obtained product was filtered and washed with methanol.

After drying at +50° C. under vacuum 1.1 gr. of copolymer were obtained.

The elementary analysis showed the presence in the copolymer of 37% of chemically combined acrylonitrile.

EXAMPLE XIV

In a 250 cc. flask, after careful replacement of the air by nitrogen, 80 gr. of liquid vinylchloride, 0.5 gr. of a 44% solution of ceric perchlorate in perchloric acid, 39 cc. of methanol and separately 0.5 cc. of $Pb(C_2H_5)_4$ were put.

The whole was kept under stirring for 3 hrs. at −40° C.; thereafter the contents of the flask were filtered and then washed with methanol.

After drying 1.6 gr. of polymer were obtained with a molecular weight of 60,000.

Although this invention has been described in the terms of specific embodiments which are indicated with detailed particulars, it is understood that this has been done only for illustrative purposes and that the invention itself is not necessarily limited to these embodiments; operable technical alternatives may be evident to those skilled in the art based upon the remainder of the specification. For this reason, modifications may be made without altering the spirit of the invention, such modifications being within the scope of the appended claims.

We claim:

1. A process for producing highly stereoregular vinylchloride polymers, comprising the step of polymerizing a monomeric component consisting of at least 75% by weight vinyl chloride at a temperature between substantially −100° C. and +50° C. and in the presence of an organic solvent by employing a catalyst system consisting essentially of an oxidizing component and a reducing component, said oxidizing component consisting essentially of at least one tetravalent-cerium compound soluble in said organic solvent, said tetravalent-cerium compound being selected from the group consisting of ceric nitrate, ceric sulfate, ceric ammonium nitrate, ceric ammonium sulfate, ceric ammonium pyrophosphate, ceric iodate and ceric perchlorate, said reducing component consisting essentially of at least one organometallic compound selected from the group consisting of tetrabutyl tin, tetraphenyl tin, tetramethyl lead and tetraethyl lead.

2. The process defined in claim 1 wherein the polymerization is carried out in a reaction medium maintained at a pH of at most 5.

3. The process defined in claim 1 wherein said oxidizing component is present in an amount ranging between substantially 0.001 and 1 part by weight of metallic cerium per 100 parts by weight of said monomeric component.

4. The process defined in claim 1 wherein said reducing component is present in an amount ranging between substantially 0.01 and 3 parts by weight per 100 parts by weight of said monomeric component.

5. The process defined in claim 1, further comprising the steps of separating from the reaction system the vinylchloride polymer produced therein and recovering trivalent-cerium compounds from the reaction system, reoxidizing said trivalent-cerium compounds to the tetravalent-cerium compound for further polymerizations of said monomeric component.

6. A process for producing highly stereoregular vinylchloride polymers, comprising the step of polymerizing a monomeric component consisting at least in major part of vinyl chloride at a temperature between substantially −100° C. and +50° C. by employing a catalyst system consisting essentially of an oxidizing component and a reducing component, said oxidizing component consisting essentially of at least one tetravalent-cerium salt, said reducing component consisting essentially of at least one organometallic compound having the structural formula

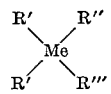

wherein Me is a metal selected from the group consisting of germanium, tin and lead; R' represents an organic radical selected from the group consisting of aralkyl, cycloalkyl, aryl and alkyl radicals; and R" and R''' represent individual valence of functionalities selected from the group consisting of respective organic radicals selected from the group consisting of aralkyl, cycloalkyl, aryl and alkyl radicals respective polar substituents, and common divalent polar substituents.

7. The process defined in claim 6 wherein the polymerization is carried out in a reaction medium maintained at a pH of at most 5.

8. The process defined in claim 6 wherein said organometallic compound is selected from the group consisting of tetrabutyl tin, tetraphenyl tin, tetramethyl lead and tetraethyl lead, and wherein said tetravalent cerium salt is selected from the group consisting of ceric nitrate, ceric sulfate, ceric ammonium nitrate, ceric ammonium sulfate, ceric ammonium pyrophosphate, ceric iodate and ceric perchlorate.

9. The process defined in claim 8 wherein said tetravalent cerium salt is present in an amount ranging between substantially 0.001 and 1 part by weight of metallic cerium per 100 parts by weight of said monomeric component, and wherein said organometallic compound is present in an amount ranging between substantially 0.01 and 3 parts by weight per 100 parts by weight of said monomeric component.

10. The process defined in claim 6, wherein said monomeric component contains at least 75% by weight vinyl chloride, said process further comprising the steps of separating from the reaction system the vinyl-chloride polymer produced therein and recovering trivalent-cerium salt from the reaction system, and reoxidizing said trivalent-cerium salt to the tetravalent-cerium salt for further polymerizations of said monomeric component.

11. A catalyst system for tthe polymerization of monomeric components consisting at least in major part of vinyl chloride, said catalyst system being constituted of an oxidizing component consisting essentially of at least one tetravalent-cerium salt, and a reducing component consisting essentially of an organometallic compound of germanium, tin and lead.

12. A catalytic system as defined in claim 11 wherein said organometallic compound is selected from the group consisting of tetrabutyl tin, tetraphenyl tin, tetramethyl lead and tetraethyl lead.

13. A catalytic system as defined in claim 12 wherein said tetravalent-cerium salt is selected from the group consisting of ceric nitrate, ceric sulfate, ceric ammonium nitrate, ceric ammonium sulfate, ceric ammonium pyrophosphate, ceric iodate and ceric perchlorate.

14. A process for producing vinyl-chloride polymers having a syndiotactic index greater than 2, comprising the steps of:

polymerizing a monomeric component consisting of at least 75% by weight vinyl chloride at a temperature between substantially −60° C. and 0° C. by employing a catalytic system constituted of an oxidizing component and a reducing component, said oxidizing component being constituted exclusively by at least one tetravalent-cerium salt and selected from the class consisting of ceric nitrate, ceric sulfate, ceric ammonium nitrate, ceric ammonium sulfate, ceric ammonium pyrophosphate, ceric iodate and ceric perchlorate, said reducing compound consisting exclusively of at least an organometallic compound selected from the group consisting of tetrabutyl tin, tetraphenyl tin, tetramethyl lead and tetraethyl lead;

separating from reaction mixture the vinyl chloride polymer thus produced; and oxidizing trivalent-cerium salt formed in said reaction mixture to render them suitable for reuse in further polymerization of vinyl-chloride monomeric components.

References Cited

UNITED STATES PATENTS

| | | | |
|---|---|---|---|
| 2,922,768 | 1/1960 | Mino et al. | 260—94.3 |
| 3,063,979 | 11/1962 | Truett et al. | 260—94.9 |
| 3,208,989 | 9/1965 | Bua et al. | 260—94.9 |

FOREIGN PATENTS 840,327   7/1960   Great Britain.

DONALD E. CZAJA, Primary Examiner

JOHN A. DONAHUE, Assistant Examiner

U.S. Cl. X.R.

252—428; 260—85.5, 87.1, 87.5